United States Patent
Uozumi

(10) Patent No.: US 12,491,795 B2
(45) Date of Patent: Dec. 9, 2025

(54) ACTIVATION METHOD FOR FUEL CELL AND ACTIVATION DEVICE THEREFOR

(71) Applicant: HONDA MOTOR CO., LTD., Tokyo (JP)

(72) Inventor: Ryo Uozumi, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 502 days.

(21) Appl. No.: 18/105,397

(22) Filed: Feb. 3, 2023

(65) Prior Publication Data

US 2023/0249585 A1  Aug. 10, 2023

(30) Foreign Application Priority Data

Feb. 8, 2022 (JP) ................. 2022-017908

(51) Int. Cl.
| | |
|---|---|
| *B60L 58/31* | (2019.01) |
| *H01M 8/04089* | (2016.01) |
| *H01M 8/04225* | (2016.01) |
| *H01M 8/04746* | (2016.01) |
| *H01M 8/2457* | (2016.01) |
| *H01M 8/10* | (2016.01) |

(52) U.S. Cl.
CPC ......... *B60L 58/31* (2019.02); *H01M 8/04089* (2013.01); *H01M 8/04225* (2016.02); *H01M 8/04753* (2013.01); *H01M 8/2457* (2016.02); *H01M 2008/1095* (2013.01); *H01M 2250/20* (2013.01)

(58) Field of Classification Search
CPC .. H01M 8/2457; H01M 8/241; H01M 8/2404; H01M 8/04225; H01M 8/04223; H01M 8/04089; H01M 8/04753; H01M 2008/1095; H01M 2250/20; B60L 58/31
See application file for complete search history.

(56) References Cited

U.S. PATENT DOCUMENTS

| | | | |
|---|---|---|---|
| 2007/0128485 A1* | 6/2007 | Zhao ................ | H01M 8/04037 429/429 |
| 2019/0348695 A1* | 11/2019 | Stimits ............. | H01M 8/04164 |
| 2022/0106060 A1* | 4/2022 | Morrison ........... | H01M 8/0438 |

FOREIGN PATENT DOCUMENTS

| | | |
|---|---|---|
| JP | 2009-199834 A | 9/2009 |
| JP | 2010-086851 A | 4/2010 |
| JP | 2013-069673 A | 4/2013 |
| JP | 2017-079194 A | 4/2017 |

OTHER PUBLICATIONS

Office Action dated Sep. 19, 2023 issued in the corresponding Japanese Patent Application No. 2022-017908 with the English machine translation thereof.

* cited by examiner

*Primary Examiner* — Raymond Alejandro
(74) *Attorney, Agent, or Firm* — Carrier, Shende & Associate P.C.; Joseph P. Carrier; Fulchand P. Shende

(57) ABSTRACT

A first supply port, a first discharge port, a second supply port, and a second discharge port are formed in a fuel cell. At a time when the fuel cell is activated, a gas supplying step, and a gas flow direction switching step are performed. In the gas supplying step, a first gas is introduced into the fuel cell through the first supply port or the first discharge port, and a second gas is introduced into the fuel cell through the second supply port or the second discharge port. In the gas flow direction switching step, the flow direction of the first gas or the flow direction of the second gas is switched to an opposite direction.

12 Claims, 9 Drawing Sheets

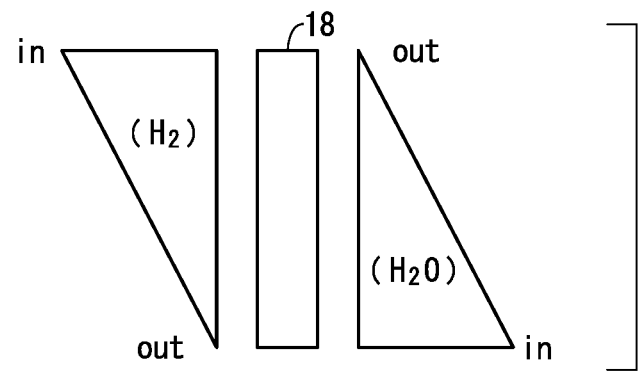
FIG. 9A FIRST SUPPLY PATTERN
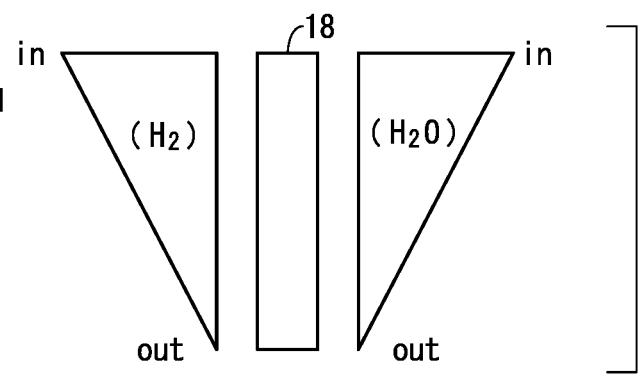
FIG. 9B SECOND SUPPLY PATTERN
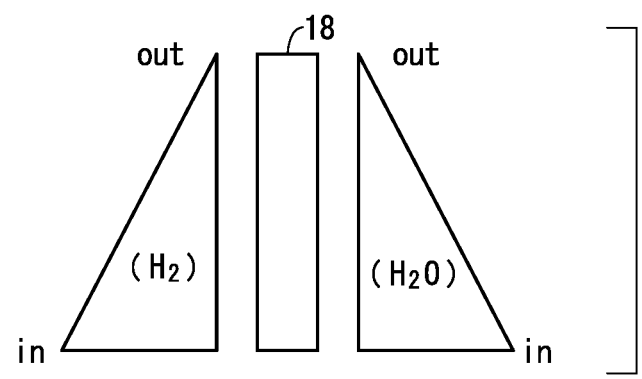
FIG. 9C THIRD SUPPLY PATTERN
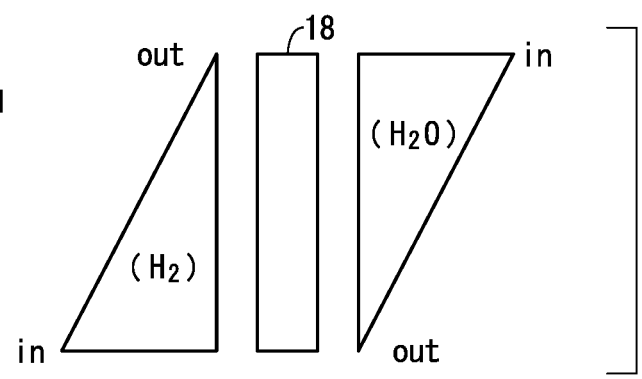
FIG. 9D FOURTH SUPPLY PATTERN

ACTIVATION METHOD FOR FUEL CELL AND ACTIVATION DEVICE THEREFOR

CROSS-REFERENCE TO RELATED APPLICATIONS

This application is based upon and claims the benefit of priority from Japanese Patent Application No. 2022-017908 filed on Feb. 8, 2022, the contents of which are incorporated herein by reference.

BACKGROUND OF THE INVENTION

Field of the Invention

The present invention relates to an activation method for a fuel cell for activating the fuel cell prior to carrying out a first operation. Further, the invention relates to an activation device configured to activate a fuel cell.

Description of the Related Art

In recent years, a fuel cell vehicle (FCV: Fuel Cell Vehicle) equipped with a fuel cell has attracted attention as a vehicle in which an environmental impact thereof is small. The fuel cell generates electricity based on an electrochemical reaction occurring between an oxygen-containing gas containing oxygen and a fuel gas containing hydrogen. As can be understood from this feature, the fuel cell vehicle only emits water vapor and does not emit carbon dioxide ($CO_2$), NOx, and SOx or the like. In the fuel cell vehicle, an electric motor is driven using electrical power obtained from the fuel cell. In accordance with this feature, the fuel cell vehicle is capable of traveling.

The fuel cell includes a membrane electrode assembly (MEA). The MEA is made up from a solid polymer electrolyte membrane having a first end surface and a second end surface, an anode provided on the first end surface of the electrolyte membrane, and a cathode provided on the second end surface of the electrolyte membrane. More specifically, the MEA is constructed by interposing the electrolyte membrane between the anode and the cathode. A unit cell of the fuel cell is assembled by sandwiching the MEA between a pair of separators. The fuel cell is generally configured as a fuel cell stack in which a plurality of the unit cells are stacked.

In the fuel cell immediately after having been assembled, the water content of the electrolyte membrane is insufficient. Accordingly, the fuel cell is incapable of obtaining a sufficient power generating performance. In order to avoid this difficulty, activation is carried out with respect to the fuel cell prior to the first operation thereof. For example, in JP 2010-086851 A, an activation method is disclosed in which heated water aging to supply heated water to the interior of the fuel cell, hydrogen pump aging, and electrical power generation aging are implemented. In the hydrogen pump aging, hydrogen gas is supplied to the anode and the cathode. In the electrical power generation aging, hydrogen gas is supplied to the anode, and an oxygen-containing gas is supplied to the cathode. Between the heated water aging and hydrogen pump aging, nitrogen gas is supplied to the anode and the cathode, and in accordance with this feature, purging is implemented. The nitrogen gas is supplied in a similar manner to both of the electrodes between the hydrogen pump aging and the electrical power generation aging.

In JP 2013-069673 A, an activation method for a fuel cell is disclosed in which a gas supply port or a gas discharge port is formed further downward than the electrodes. In this case, humidified gas is supplied to the electrodes from the gas supply port or the gas discharge port, and a voltage is applied to the MEA.

SUMMARY OF THE INVENTION

In the fuel cell, a hydrogen gas and an oxygen-containing gas are made to flow along the respective surface directions of the anode and the cathode. Similarly, when activation is carried out with respect to the fuel cell, a gas in order to carry out the activation flows along the surface directions of the anode and the cathode. More specifically, each of the anode and the cathode includes a portion positioned upstream in the gas flow direction, and a portion positioned downstream in the gas flow direction.

The gas supplied to the anode, for example, is hydrogen gas. The gas supplied to the cathode, for example, is an inert gas containing water vapor (a humid inert gas). The hydrogen and the water vapor are actively consumed in the upstream portion in the anode and the cathode, at a time when the hydrogen gas and the humid inert gas flow respectively to the anode and the cathode. Therefore, the concentrations of the hydrogen and the water vapor are low in the downstream portions in the anode and the cathode.

Under such circumstances, if the activation treatment time is short, the degree of activation may differ between the upstream portion in the anode and the cathode, and the downstream portion in the anode and the cathode. To avoid this difficulty and in order to make the degree of activation uniform over the entire unit cell, it is necessary to lengthen the time period of the activation treatment. Accordingly, it is not easy to improve the efficiency of the activation treatment.

The present invention has the object of solving the aforementioned problems.

According to one aspect of the present invention, there is provided an activation method for a fuel cell, for activating the fuel cell, the fuel cell being equipped with a membrane electrode assembly in which an electrolyte membrane is sandwiched between an anode and a cathode, a first supply port configured to supply a fuel gas to the anode, a first discharge port configured to discharge the fuel gas from the anode, a second supply port configured to supply an oxygen-containing gas to the cathode, and a second discharge port configured to discharge the oxygen-containing gas from the cathode, the activation method for the fuel cell including an activation step of activating the fuel cell using a hydrogen gas and a wet gas, the activation step including a first activation step of causing the hydrogen gas to flow into the fuel cell through the first supply port or the first discharge port, and causing the wet gas to flow into the fuel cell through the second supply port or the second discharge port, a second activation step, after completion of the first activation step, of causing the hydrogen gas to flow into the fuel cell through the first supply port or the first discharge port, and causing the wet gas to flow into the fuel cell through the second supply port or the second discharge port, and a direction switching step, at a time of transitioning from the first activation step to the second activation step, of switching a flow direction of at least one of the hydrogen gas or the wet gas to an opposite direction.

According to another aspect of the present invention, there is provided an activation device configured to activate a fuel cell equipped with a membrane electrode assembly in which an electrolyte membrane is sandwiched between an anode and a cathode, a first supply port configured to supply a fuel gas to the anode, a first discharge port configured to discharge the fuel gas from the anode, a second supply port configured to supply an oxygen-containing gas to the cathode, and a second discharge port configured to discharge the oxygen-containing gas from the cathode, the activation device including a first gas line connected to the first supply port, a first gas supply unit connected to the first gas line and configured to supply a first gas, a second gas line connected to the first discharge port, a first switching line connected to the first gas line and the second gas line, a first switching valve configured to switch between a state in which the first gas supplied from the first gas supply unit is made to flow from the first gas line to the first supply port, and a state in which the first gas supplied from the first gas supply unit and that has flowed into the first gas line passes through the first switching line and is made to flow from the second gas line to the first discharge port, a third gas line connected to the second supply port, a second gas supply unit connected to the third gas line and configured to supply a second gas, a fourth gas line connected to the second discharge port, a second switching line connected to the third gas line and the fourth gas line, a second switching valve configured to switch between a state in which the second gas supplied from the second gas supply unit is made to flow from the third gas line to the second supply port, and a state in which the second gas supplied from the second gas supply unit and that has flowed into the third gas line passes through the second switching line and is made to flow from the third gas line to the second discharge port, and a control unit configured to control the first switching valve and the second switching valve, and thereby switch a flow direction of each of the first gas and the second gas.

In the activation step, the gas flow directions (the supply patterns) are switched. Accordingly, in the membrane electrode assembly, in the second activation step, a high concentration gas comes into contact with respect to a portion that has come into contact with a low concentration gas in the first activation step. Therefore, in the activation step, it is possible to uniformly activate substantially the entire membrane electrode assembly. Stated otherwise, the degree of activation in the membrane electrode assembly can be made uniform. Further, the activation of the membrane electrode assembly progresses in a relatively short time period. More specifically, the membrane electrode assembly can be uniformly and efficiently activated.

The activation device includes a configuration that makes it possible to switch the gas supply patterns. Therefore, according to such an activation device, it is possible to switch the gas supply patterns in various ways, in accordance with the progress of the steps of the activation method. In accordance with this feature, the activation device uniformly and efficiently activates the membrane electrode assembly.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 9A is a schematic diagram showing a hydrogen concentration gradient at an anode, and a water vapor concentration gradient at a cathode, at a time when gases are supplied in the first supply pattern;
FIG. 9B is a schematic diagram showing the hydrogen concentration gradient at the anode, and the water vapor concentration gradient at the cathode, at a time when the gases are supplied in the second supply pattern;
FIG. 9C is a schematic diagram showing the hydrogen concentration gradient at the anode, and the water vapor concentration gradient at the cathode, at a time when the gases are supplied in the third supply pattern;
and
FIG. 9D is a schematic diagram showing the hydrogen concentration gradient at the anode, and the water vapor concentration gradient at the cathode, at a time when the gases are supplied in the fourth supply pattern.

DETAILED DESCRIPTION OF THE INVENTION

Figure 1:
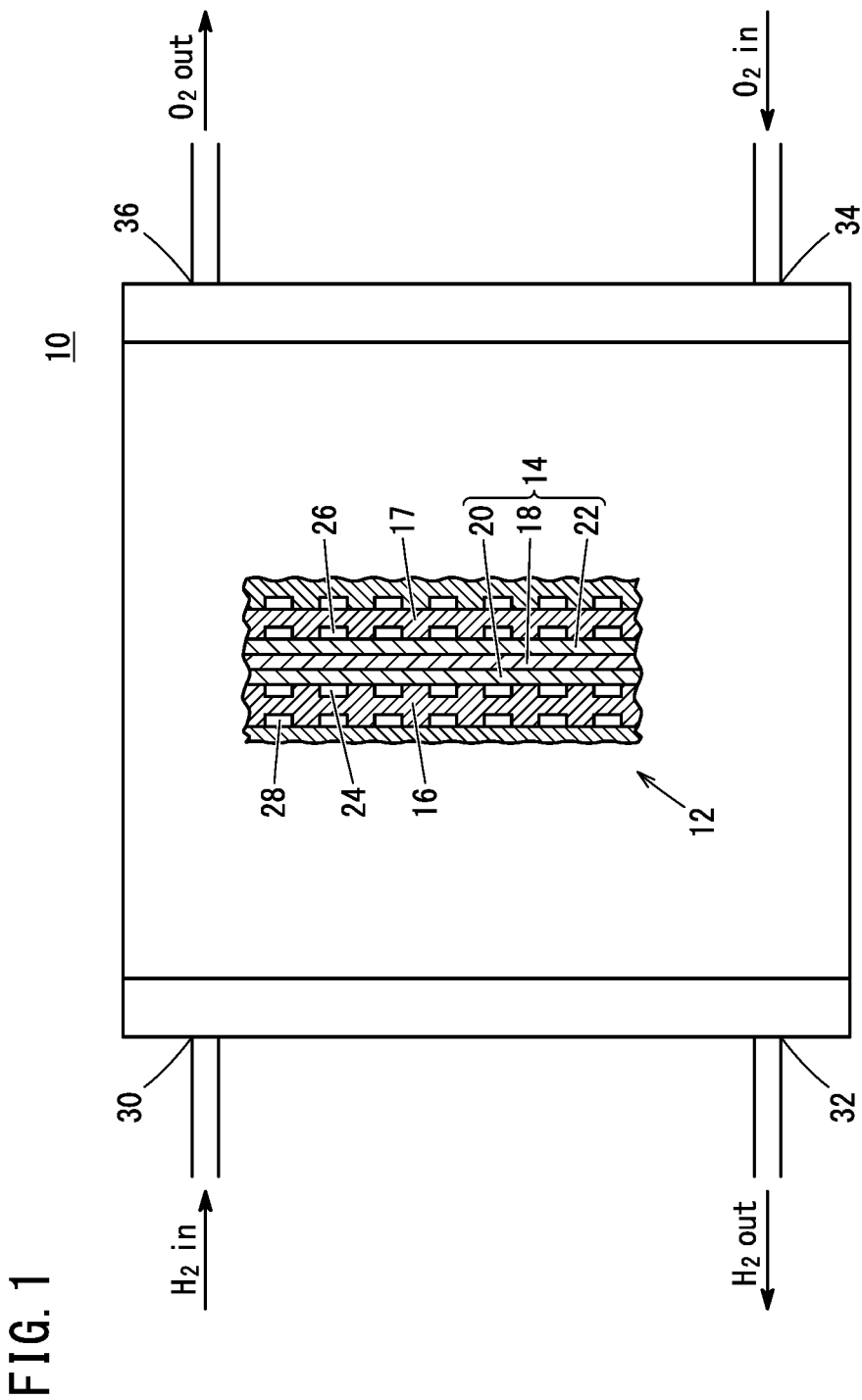
FIG. 1 is a partial cross-sectional side view of a fuel cell.

Initially, a schematic description of a fuel cell 10 will be presented with reference to FIG. 1. In the present embodiment, the fuel cell 10 is configured in the form of a fuel cell stack. A plurality of unit cells 12 are stacked in the fuel cell stack. One individual unit cell 12 comprises a membrane electrode assembly (MEA) 14, and a pair of separators 16 and 17 that sandwich the MEA therebetween. Furthermore, the MEA 14 is constituted by sandwiching an electrolyte membrane 18 made of a solid polymer between an anode 20 and a cathode 22. As the solid polymer, perfluorosulfonic acid or the like is exemplified.

In one separator 16, a first flow path (which will also be referred to a first flow field) 24 is formed on the end surface facing toward the anode 20. In the other separator 17, a second flow path (which will also be referred to a second flow field) 26 is formed on the end surface facing toward the cathode 22. A coolant flow path (which will also be referred to a coolant flow field) 28 is formed between the separator 16 of one unit cell 12 and the separator 17 of another unit cell 12 adjacent to the one unit cell 12.

A first supply port 30 and a first discharge port 32 are formed in the fuel cell 10. The first supply port 30 and the first discharge port 32 communicate with each other through the first flow paths 24 of all of the unit cells 12. A second supply port 34 and a second discharge port 36 are formed in the fuel cell 10. The second supply port 34 and the second discharge port 36 communicate with each other through the second flow paths 26 of all of the unit cells 12. The first discharge port 32 and the second supply port 34 are formed in a lower part of the fuel cell 10. In contrast thereto, the first supply port 30 and the second discharge port 36 are formed in an upper part of the fuel cell 10. A coolant supply port and a coolant discharge port are also formed in the fuel cell 10, although these features are not illustrated.

In the case that the fuel cell 10 is made to generate electricity, a fuel gas containing hydrogen gas is supplied from the first supply port 30. When the fuel gas flows through the first flow path 24, the hydrogen gas causes an electrochemical reaction at the anode 20. An excessive amount of the fuel gas passes through the first flow path 24 and is discharged from the first discharge port 32. At the same time, an oxygen-containing gas containing oxygen is supplied from the second supply port 34. When the oxygen-containing gas flows through the second flow path 26, the oxygen causes an electrochemical reaction at the cathode 22. An excessive amount of the oxygen-containing gas passes through the second flow path 26 and is discharged from the second discharge port 36.

Figure 2:
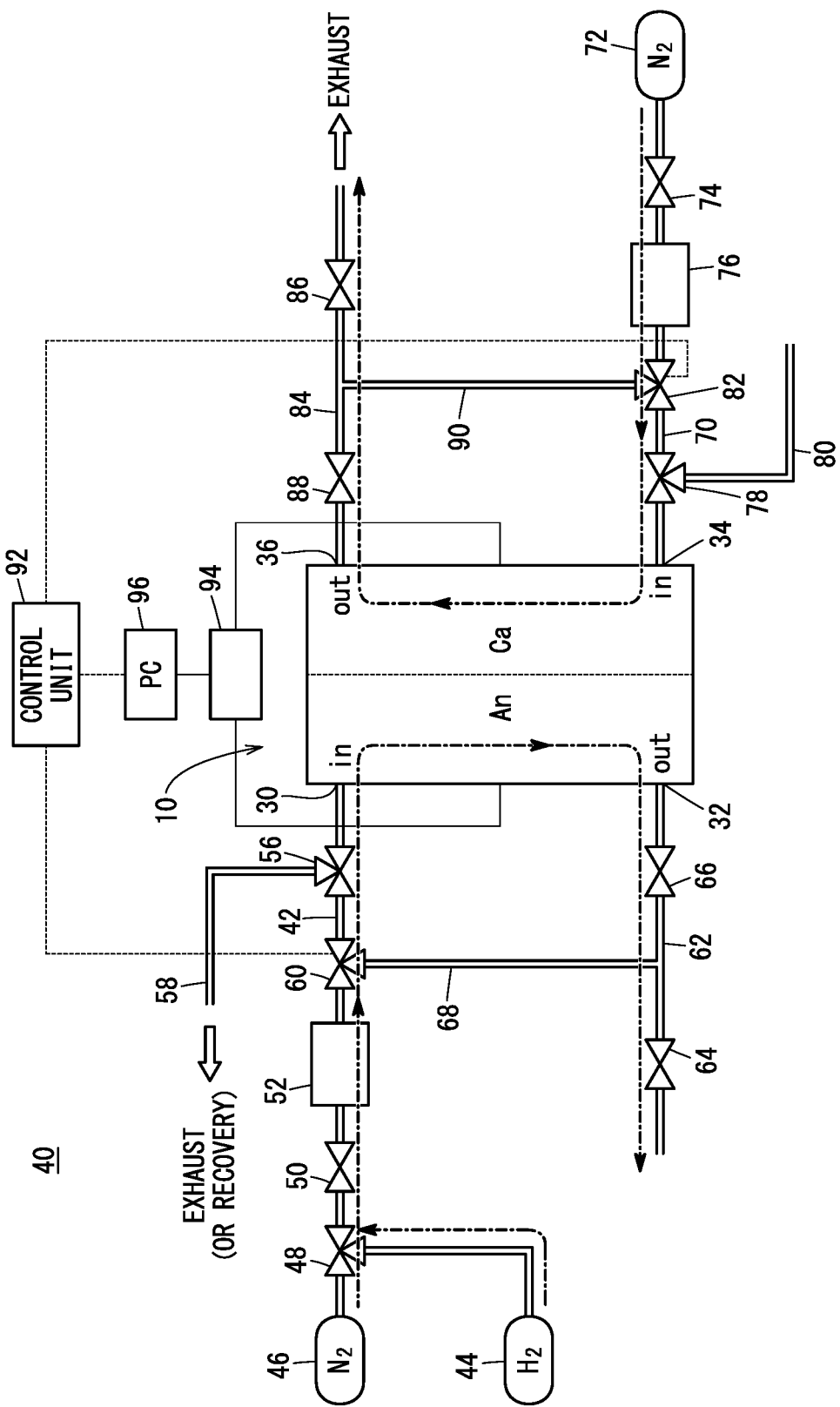
FIG. 2 is a schematic system diagram showing, in an activation device according to an embodiment of the present invention, a state in which a first gas and a second gas are supplied to the fuel cell in a first supply pattern.

Next, with reference to FIG. 2, a description will be given concerning an activation device 40 according to the present embodiment. Moreover, it should be noted that, in FIG. 2, illustration of the fuel cell 10 is shown in a simplified manner. The same feature applies to the drawings after FIG. 2.

FIG. 2 is a schematic system diagram of the activation device 40. The activation device 40 includes a first gas line 42. A hydrogen gas supply unit 44 and a nitrogen gas supply unit (inert gas supply unit) 46 are connected to one end of the first gas line 42 via a three-way valve 48. The other end of the first gas line 42 is connected to the first supply port 30. The hydrogen gas supply unit 44, for example, is a hydrogen gas tank. The nitrogen gas supply unit 46, for example, is a nitrogen gas tank. In the present embodiment, the nitrogen gas is used as an inert gas (inactive gas). The hydrogen gas supply unit 44 and the nitrogen gas supply unit 46 are first gas supply unit, and a hydrogen gas or a nitrogen gas is selectively supplied as a first gas.

A first shutoff valve 50, a first humidification unit 52, and a first preliminary exhaust valve 56 are provided in the first gas line 42. By the first shutoff valve 50 being placed in an open state, the first gas flows from the first gas supply unit to the first gas line 42. By placing the first shutoff valve 50 in a closed state, the flow of the first gas from the first gas supply unit to the first gas line 42 is shut off. The first humidification unit 52 adds water vapor to the first gas (the hydrogen gas or the nitrogen gas). Consequently, the first gas becomes a wet gas.

The first preliminary exhaust valve 56, for example, is a three-way valve. One end of a first preliminary exhaust line 58 is connected to the first preliminary exhaust valve 56. The other end of the first preliminary exhaust line 58, for example, is open to the atmosphere. Accordingly, accompanying the first preliminary exhaust valve 56 being operated, it is possible to switch between a state in which the first supply port 30 and the first preliminary exhaust line 58 are in communication and a state in which the first supply port 30 and the first gas line 42 are in communication.

A first switching valve 60 is provided in the first gas line 42, at a position more downstream than the first humidification unit 52 and more upstream than the first preliminary exhaust valve 56. The first switching valve 60, for example, is a three-way valve.

The activation device 40 includes a second gas line 62. A first exhaust valve 64 is provided at one end of the second gas line 62. The other end of the second gas line 62 is connected to the first discharge port 32. A first opening/closing valve 66 is provided at the other end of the second gas line 62.

Figure 4:
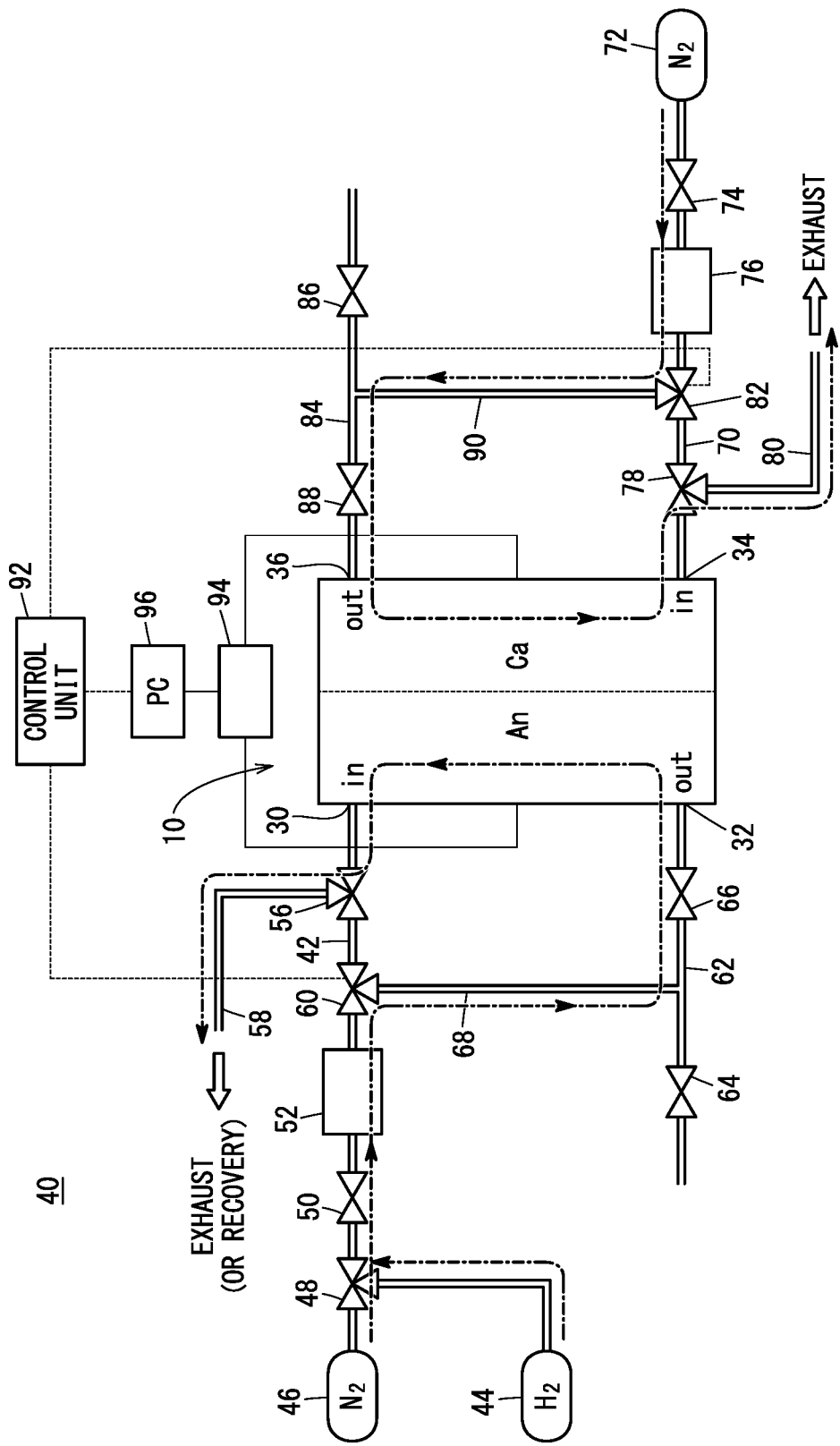
FIG. 4 is a schematic system diagram showing a state in which the activation device supplies the first gas and the second gas to the fuel cell in a fourth supply pattern.

A first switching line 68 is connected to the first gas line 42 and the second gas line 62. The first switching line 68 and the first gas line 42 are connected via the first switching valve 60. By the first switching valve 60, the first gas is switched between a state of flowing in a first forward direction and a state of flowing in a first reverse direction. As shown in FIG. 2, the first forward direction is a direction in which, after the first gas has flowed from the first gas line 42 and through the first supply port 30, the first gas passes through the first flow path 24 and flows from the first discharge port 32 and through the second gas line 62. As shown in FIG. 4, the first reverse direction is a direction in which, after the first gas has flowed from the first gas line 42 and into the first switching line 68, the first gas flows from the second gas line 62 and through the first discharge port 32, and next, passes through the first flow path 24, and flows from the first supply port 30 and through the first gas line 42.

The activation device 40 includes a third gas line 70. A nitrogen gas supply unit (inert gas supply unit) 72 is connected to one end of the third gas line 70. The other end of the third gas line 70 is connected to the second supply port 34. The nitrogen gas supply unit 72, for example, in the same manner as described above, is a nitrogen gas tank. The nitrogen gas supply unit 72 is a second gas supply unit, and nitrogen gas is supplied as an inert second gas. According to the present embodiment, the nitrogen gas supply unit 46 which is connected to the first gas line 42 and the nitrogen gas supply unit 72 which is connected to the third gas line 70 are separately provided. However, one individual nitrogen gas supply unit may be connected to both of the first gas line 42 and the third gas line 70.

A second shutoff valve 74, a second humidification unit 76, and a second preliminary exhaust valve 78 are provided in the third gas line 70. By the second shutoff valve 74 being placed in an open state, the second gas flows from the second gas supply unit to the third gas line 70. By placing the second shutoff valve 74 in a closed state, the flow of the second gas from the second gas supply unit to the third gas line 70 is shut off. The second humidification unit 76 adds water vapor to the second gas (the nitrogen gas). Consequently, the second gas becomes a wet gas.

The second preliminary exhaust valve 78, for example, is a three-way valve. One end of a second preliminary exhaust line 80 is connected to the second preliminary exhaust valve 78. The other end of the second preliminary exhaust line 80, for example, is open to the atmosphere. Accordingly, accompanying the second preliminary exhaust valve 78 being operated, it is possible to switch between a state in which the second supply port 34 and the second preliminary exhaust line 80 are in communication and a state in which the second supply port 34 and the third gas line 70 are in communication.

A second switching valve 82 is provided in the third gas line 70, at a position more downstream than the second humidification unit 76 and more upstream than the second preliminary exhaust valve 78. The second switching valve 82, for example, is a three-way valve in the same manner as the first switching valve 60.

The activation device 40 includes a fourth gas line 84. A second exhaust valve 86 is provided at one end of the fourth gas line 84. The other end of the fourth gas line 84 is connected to the second discharge port 36. A second opening/closing valve 88 is provided at the other end of the fourth gas line 84.

A second switching line 90 is connected to the third gas line 70 and the fourth gas line 84. The second switching line 90 and the third gas line 70 are connected via the second switching valve 82. By the second switching valve 82, the second gas is switched between a state of flowing in a second forward direction and a state of flowing in a second reverse direction. As shown in FIG. 2, the second forward direction is a direction in which, after the second gas has flowed from the third gas line 70 and through the second supply port 34, the second gas passes through the second flow path 26 and flows from the second discharge port 36 and through the fourth gas line 84. As shown in FIG. 4, the second reverse direction is a direction in which, after the second gas has flowed from the third gas line 70 and into the second switching line 90, the second gas flows from the fourth gas line 84 and through the second discharge port 36, and next, passes through the second flow path 26, and flows from the second supply port 34 and through the third gas line 70.

The first switching valve 60 and the second switching valve 82 are electrically connected with respect to a control unit 92. By controlling the first switching valve 60, the control unit 92 switches the flow direction of the first gas from the first forward direction to the first reverse direction, or alternatively, switches the flow direction of the first gas from the first reverse direction to the first forward direction. By controlling the second switching valve 82, the control unit 92 switches the flow direction of the second gas from the second forward direction to the second reverse direction, or alternatively, switches the flow direction of the second gas from the second reverse direction to the second forward direction.

The activation device 40 includes a voltage application unit 94 that applies a voltage to the MEA 14. Although not shown in particular, the voltage application unit 94 typically includes a potentiostat electrically connected to the MEA 14, and a potential sweeper that controls the potentiostat.

The activation device 40 includes a personal computer (PC) 96. The control unit may be configured by one or more processors such as a CPU (central processing unit) of the PC 96. Although not shown in particular, the PC 96 includes a hard disk drive (a storage device) and a display. The display displays a cyclic voltammogram, on the basis of the voltage applied with respect to the MEA 14. Predetermined program software is stored in the hard disk drive. On the basis of the cyclic voltammogram, the program software obtains an electrochemically active surface area (ECSA) of an electrode catalyst in each of the anode 20 and the cathode 22.

The ECSA serves as an index for judging the extent to which the activation of the MEA 14 (especially the electrode catalyst) has progressed. In this manner, the PC 96 serves as an index acquisition unit that acquires the index representing the degree of activation of the MEA 14. Information in relation to the ECSA obtained by the PC 96 is delivered to the control unit 92.

Figure 3:
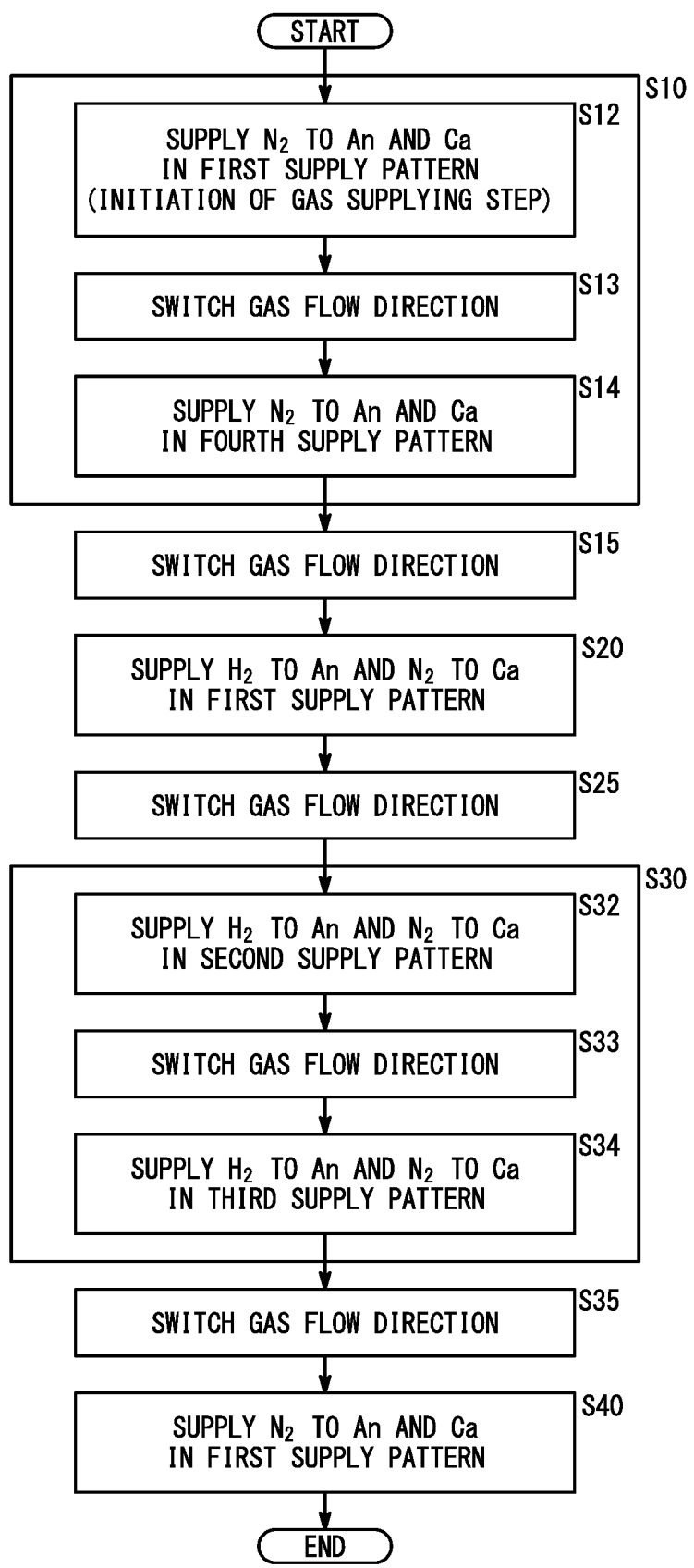
FIG. 3 is a schematic flow diagram of an activation method according to an embodiment of the present invention.

Next, a description will be given concerning a method of activating the fuel cell 10 according to the present embodiment. FIG. 3 is a schematic flow diagram of the activation method. It should be noted that "An" in FIG. 3 represents the anode 20, and "Ca" in FIG. 3 represents the cathode 22.

Initially, the first gas line 42, the second gas line 62, the third gas line 70, and the fourth gas line 84 are respectively connected to the first supply port 30, the first discharge port 32, the second supply port 34, and the second discharge port 36 of the fuel cell 10 prior to operation thereof. Further, the voltage application unit 94 is electrically connected to a current collecting terminal of the fuel cell 10. In this state, the operator issues a command signal to the control unit 92 to the effect that "start activation of the fuel cell 10". Based on the command signal, the control unit 92 executes a scavenging step S10, a preparation step S20, an activation step S30, and a rescavenging step S40.

The scavenging step S10 includes a first scavenging step S12 and a second scavenging step S14. When transitioning from the first scavenging step S12 to the second scavenging step S14, a first in-step switching step S13 is executed.

In order to perform the first scavenging step S12, the control unit 92 that has received the command signal causes the three-way valve 48 to be operated in a direction in which the nitrogen gas supply unit 46 is made to communicate with the first gas line 42. The control unit 92 places the first shutoff valve 50, the first opening/closing valve 66, and the first exhaust valve 64 in an open state. Further, the control unit 92 causes the first switching valve 60 to be operated in a direction in which communication between the first gas line 42 and the first switching line 68 is shut off. Consequently, the nitrogen gas flows from the nitrogen gas supply unit 46 along the first forward direction. Specifically, the nitrogen gas flows into the first gas line 42 and passes through the first humidification unit 52, the first switching valve 60, and the first preliminary exhaust valve 56. Next, the nitrogen gas flows into the interior of the fuel cell 10 from the first supply port 30, and flows through the first flow path 24.

Thereafter, the nitrogen gas flows out from the first flow path 24 and into the first discharge port 32, and flows through the second gas line 62. At this time, the nitrogen gas passes through the first opening/closing valve 66 and the first exhaust valve 64. The nitrogen gas that has passed through the first exhaust valve 64, for example, is discharged into the atmosphere.

On the other hand, the control unit 92 places the second shutoff valve 74, the second opening/closing valve 88, and the second exhaust valve 86 in an open state. Further, the control unit 92 causes the second switching valve 82 to be operated in a direction in which communication between the third gas line 70 and the second switching line 90 is shut off. Consequently, the nitrogen gas flows from the nitrogen gas supply unit 72 along the second forward direction. Specifically, the nitrogen gas flows into the third gas line 70 and passes through the second humidification unit 76, the second switching valve 82, and the second preliminary exhaust valve 78. Next, the nitrogen gas flows into the interior of the fuel cell 10 from the second supply port 34, and flows through the second flow path 26.

Thereafter, the nitrogen gas flows out from the second flow path 26 and into the second discharge port 36, and flows through the fourth gas line 84. At this time, the nitrogen gas passes through the second opening/closing valve 88 and the second exhaust valve 86. The nitrogen gas that has passed through the second exhaust valve 86, for example, is discharged into the atmosphere. The aforementioned situation is shown in FIG. 2. In this case, a first supply pattern is formed in which humid nitrogen gas is supplied along the first forward direction, and the humid nitrogen gas is supplied along the second forward direction.

When the nitrogen gas passes through the first humidification unit 52, water vapor (moisture) is added to the nitrogen gas. More specifically, the nitrogen gas that has passed through the first humidification unit 52 is humid nitrogen gas. The humid nitrogen gas comes into contact with the anode 20 in the interior of the fuel cell 10. Due to such contact, moisture is imparted to an end surface of the electrolyte membrane 18 facing toward the anode 20. Similarly, when the nitrogen gas passes through the second humidification unit 76, water vapor (moisture) is added to the nitrogen gas. More specifically, the nitrogen gas that has passed through the second humidification unit 76 is humid nitrogen gas. The humid nitrogen gas comes into contact with the cathode 22 in the interior of the fuel cell 10. Due to such contact, moisture is imparted to an end surface of the electrolyte membrane 18 facing toward the cathode 22.

In the foregoing manner, the first scavenging step S12 is initiated. In the first scavenging step S12, the humid nitrogen gas supplied to the interior of the fuel cell 10 in the manner described above pushes out the air that remains in the interior of the fuel cell 10. More specifically, the air inside the fuel cell 10 is scavenged and the interior of the fuel cell 10 is replaced with the humid nitrogen gas.

In the electrolyte membrane 18, there is a possibility that a concentration gradient will be formed in the moisture imparted from the humid nitrogen gas. Specifically, in the electrolyte membrane 18, at the end surface facing toward the anode 20, it is conjectured that the concentration of the water vapor is high on the side of the first supply port 30, and the concentration of the water vapor is low on the side of the first discharge port 32. The concentration gradient of the moisture in the anode 20 is similar to the above concentration gradient of the water vapor. With respect to this feature, in the electrolyte membrane 18, at the end surface facing toward the cathode 22, it is conjectured that the concentration of the water vapor is high on the side of the second supply port 34, and the concentration of the water vapor is low on the side of the second discharge port 36. The concentration gradient of the moisture in the cathode 22 is similar to the above concentration gradient of the water vapor.

In the present embodiment, the control unit 92 switches the flow direction of the humid nitrogen gas after a predetermined time period has elapsed since the first scavenging step S12 was initiated. Stated otherwise, the first in-step switching step S13 is executed. Specifically, as shown in FIG. 4, the humid nitrogen gas that is supplied to the anode 20 is made to flow along the first reverse direction, and the humid nitrogen gas supplied to the cathode 22 is made to flow along the second reverse direction. Stated otherwise, in this case, a fourth supply pattern is formed.

Specifically, the control unit 92 switches the first exhaust valve 64 to a closed state. The control unit 92 causes the first switching valve 60 to be operated in a direction in which communication takes place between the first gas line 42 and the first switching line 68. The control unit 92 causes the first preliminary exhaust valve 56 to be operated in a direction in which communication takes place between the first gas line 42 and the first preliminary exhaust line 58. In the manner described above, the nitrogen gas that has flowed into the first gas line 42 from the nitrogen gas supply unit 46 passes through the first humidification unit 52, and after having become a humid nitrogen gas, the nitrogen gas flows into the second gas line 62 via the first switching valve 60 and the first switching line 68.

Next, the humid nitrogen gas passes through the first opening/closing valve 66 and flows into the interior of the fuel cell 10 from the first discharge port 32. Thereafter, the humid nitrogen gas passes through the first flow path 24 and the first supply port 30, and flows into the first preliminary exhaust line 58 via the first preliminary exhaust valve 56. Furthermore, thereafter, the humid nitrogen gas is discharged from the first preliminary exhaust line 58, for example, into the atmosphere.

At the same time, the control unit 92 switches the second exhaust valve 86 to a closed state. The control unit 92 causes the second switching valve 82 to be operated in a direction in which communication takes place between the third gas line 70 and the second switching line 90. The control unit 92 causes the second preliminary exhaust valve 78 to be operated in a direction in which communication takes place between the fourth gas line 84 and the second preliminary exhaust line 80. In the manner described above, the nitrogen gas that has flowed into the third gas line 70 from the nitrogen gas supply unit 72 passes through the second humidification unit 76, and after having become a humid nitrogen gas, the nitrogen gas flows into the fourth gas line 84 via the second switching valve 82 and the second switching line 90.

Next, the humid nitrogen gas passes through the second opening/closing valve 88 and flows into the interior of the fuel cell 10 from the second discharge port 36. Thereafter, the humid nitrogen gas passes through the second flow path 26 and the second supply port 34, and flows into the second preliminary exhaust line 80 via the second preliminary exhaust valve 78. Furthermore, thereafter, the humid nitrogen gas is discharged from the second preliminary exhaust line 80, for example, into the atmosphere. After the flow directions of the first gas and the second gas have been reversed in the manner described above, the supply of the gas is continued, thereby transitioning from the first in-step switching step S13 to the second scavenging step S14.

In the fourth supply pattern, the moisture concentration gradient imparted to the electrolyte membrane 18 is conjectured to be opposite to that in the first supply pattern. Specifically, in the electrolyte membrane 18, at the end surface facing toward the anode 20, the concentration of the water vapor is low on the side of the first supply port 30, and the concentration of the water vapor is high on the side of the first discharge port 32. The same feature applies to the concentration gradient of the moisture in the anode 20. On the other hand, in the electrolyte membrane 18, at the end surface facing toward the cathode 22, the concentration of the water vapor is low on the side of the second supply port 34, and the concentration of the water vapor is high on the side of the second discharge port 36. The same feature applies to the concentration gradient of the moisture in the cathode 22.

Accordingly, in the scavenging step S10, by carrying out the supply of gas in the fourth supply pattern (the second scavenging step S14) after having carried out the supply of gas in the first supply pattern (the first scavenging step S12), it is possible to achieve uniformity in the concentration of moisture imparted to the anode 20, the cathode 22, and the electrolyte membrane 18. Moreover, it should be noted that the combination of the supply pattern in the first scavenging step S12 and the supply pattern in the second scavenging step S14 is optionally selected, and is not limited to the combination described above. For example, in contrast to what is described above, the supply of the gas may be carried out according to the first supply pattern, after the supply of the gas has been carried out according to the fourth supply pattern.

After a predetermined time period has elapsed since having switched the flow direction of the humid nitrogen gas, a first inter-step switching step S15 is executed prior to transitioning to the preparation step S20. In the first inter-step switching step S15, the control unit 92 causes the humid hydrogen gas to flow along the first forward direction, and in addition, causes the humid nitrogen gas to flow along the second forward direction. Stated otherwise, the first gas and the second gas are supplied respectively to the anode 20 and the cathode 22 in the first supply pattern.

In order to cause the humid hydrogen gas to flow along the first forward direction, and to cause the wet nitrogen gas to flow along the second forward direction, the control unit 92 causes the three-way valve 48 to be operated in a direction in which the hydrogen gas supply unit 44 is made to communicate with the first gas line 42. Further, the control unit 92 places the first shutoff valve 50, the first opening/closing valve 66, and the first exhaust valve 64 in an open state, and causes the first switching valve 60 to be operated in a direction in which communication between the first gas line 42 and the first switching line 68 is shut off. On the other hand, the control unit 92 places the second shutoff valve 74, the second opening/closing valve 88, and the second exhaust valve 86 in an open state, and causes the second switching valve 82 to be operated in a state in which communication between the third gas line 70 and the second switching line 90 is shut off.

The hydrogen gas flows from the hydrogen gas supply unit 44 into the first gas line 42, passes through the first humidification unit 52, and thereby becomes the humid hydrogen gas. The humid hydrogen gas passes through the first switching valve 60 and the first preliminary exhaust valve 56, and flows into the interior of the fuel cell 10 from the first supply port 30, and then flows through the first flow path 24. The humid hydrogen gas flows out from the first flow path 24 and into the first discharge port 32, and flows through the second gas line 62. At this time, the humid hydrogen gas passes through the first opening/closing valve 66 and the first exhaust valve 64. The humid hydrogen gas that has passed through the first exhaust valve 64 passes through a gas-liquid separator and is recovered, for example, by a hydrogen recovery device.

On the other hand, the nitrogen gas flows from the nitrogen gas supply unit 72 into the third gas line 70, passes through the second humidification unit 76, and thereby becomes the humid nitrogen gas. The humid nitrogen gas passes through the second switching valve 82 and the second preliminary exhaust valve 78, and flows into the interior of the fuel cell 10 from the second supply port 34, and then flows through the second flow path 26. The humid nitrogen gas flows out from the second flow path 26 and into the second discharge port 36, and flows through the fourth gas line 84. At this time, the humid nitrogen gas passes through the second opening/closing valve 88 and the second exhaust valve 86. The humid nitrogen gas that has passed through the second exhaust valve 86, for example, is discharged into the atmosphere.

Thereafter, by continuing to supply the gas, the process transitions from the first inter-step switching step S15 to the preparation step S20. In the preparation step S20, the humid nitrogen gas inside the first flow path 24 is replaced with the humid hydrogen gas.

Figure 5:
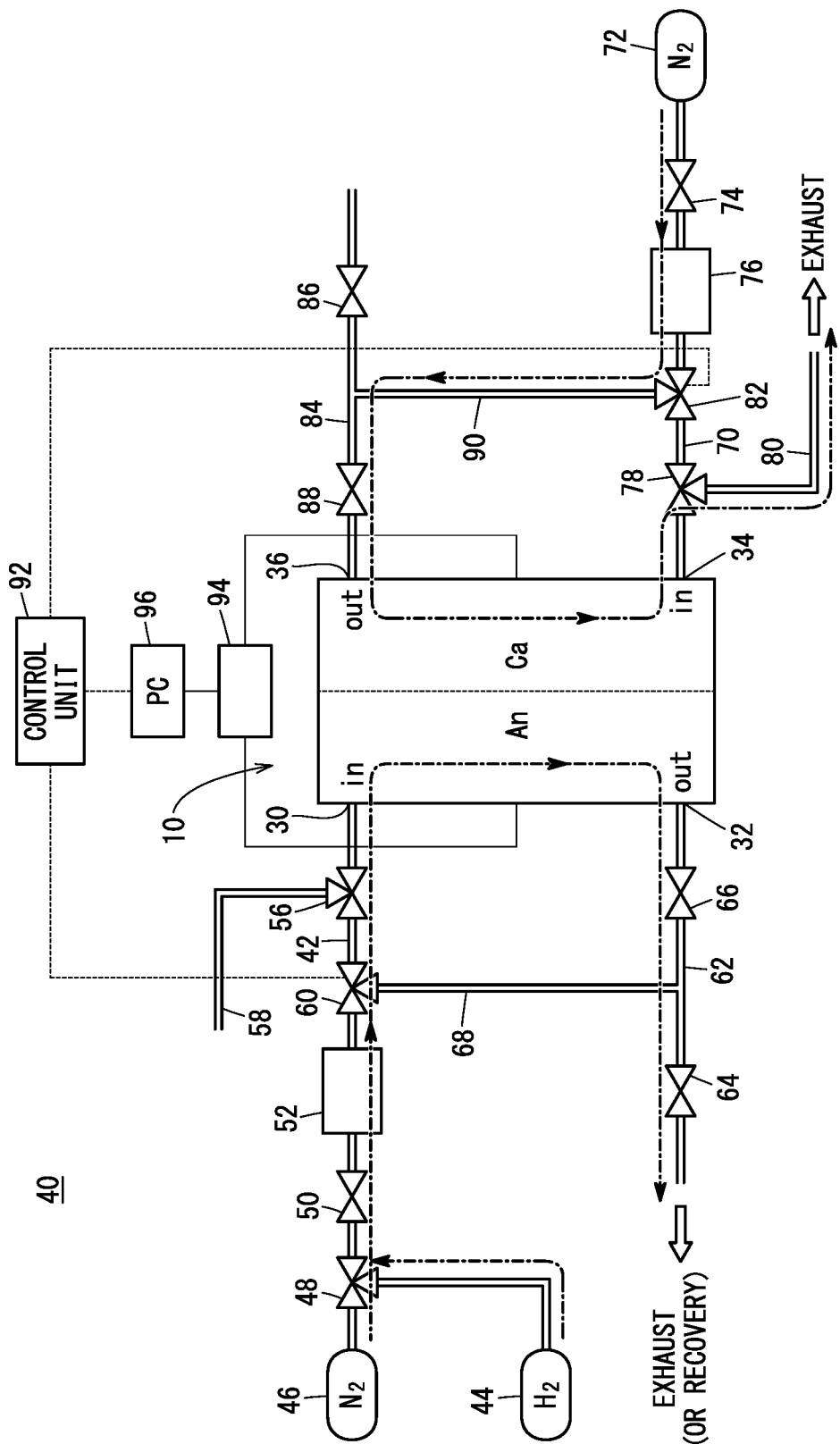
FIG. 5 is a schematic system diagram showing a state in which the activation device supplies the first gas and the second gas to the fuel cell in a second supply pattern.

After a predetermined time period has elapsed, the control unit 92 performs a second inter-step switching step S25. In this instance, in a first activation step S32, which takes place from an initial stage to an intermediate stage of the activation step S30, as shown in FIG. 5, the humid hydrogen gas that is supplied to the anode 20 is made to flow along the first forward direction, and the humid nitrogen gas supplied to the cathode 22 is made to flow along the second reverse direction. Stated otherwise, in this case, a second supply pattern is formed. In the second inter-step switching step S25, the control unit 92 performs a control in order to form the second supply pattern.

Specifically, the control unit 92 switches the second exhaust valve 86 to a closed state, and causes the second switching valve 82 to be operated in a direction in which communication takes place between the third gas line 70 and the second switching line 90. Further, the control unit 92 causes the second preliminary exhaust valve 78 to be operated in a direction in which communication takes place between the fourth gas line 84 and the second preliminary exhaust line 80. In the manner described above, the nitrogen gas that has flowed into the third gas line 70 from the nitrogen gas supply unit 72 passes through the second humidification unit 76, and after having become a humid nitrogen gas, the nitrogen gas flows into the fourth gas line 84 via the second switching valve 82 and the second switching line 90.

Next, the humid nitrogen gas passes through the second opening/closing valve 88 and flows into the interior of the fuel cell 10 from the second discharge port 36. Thereafter, the humid nitrogen gas passes through the second flow path 26 and the second supply port 34, and flows into the second preliminary exhaust line 80 via the second preliminary exhaust valve 78. Furthermore, thereafter, the humid nitrogen gas is discharged from the second preliminary exhaust line 80, for example, into the atmosphere.

As noted previously, the second inter-step switching step S25 in which the second supply pattern is formed is executed. Thereafter, by continuing the supply of gas while the second supply pattern is maintained, the process transitions to the activation step S30. In this instance, the activation step S30 includes the first activation step S32 and a second activation step S34. The first activation step S32 takes place from the initial stage to the intermediate stage in the activation step S30, and the second activation step S34 takes place from the intermediate stage to the final stage in the activation step S30. As can be understood from this feature, the first activation step S32 is executed immediately after the second inter-step switching step S25.

Figure 6:
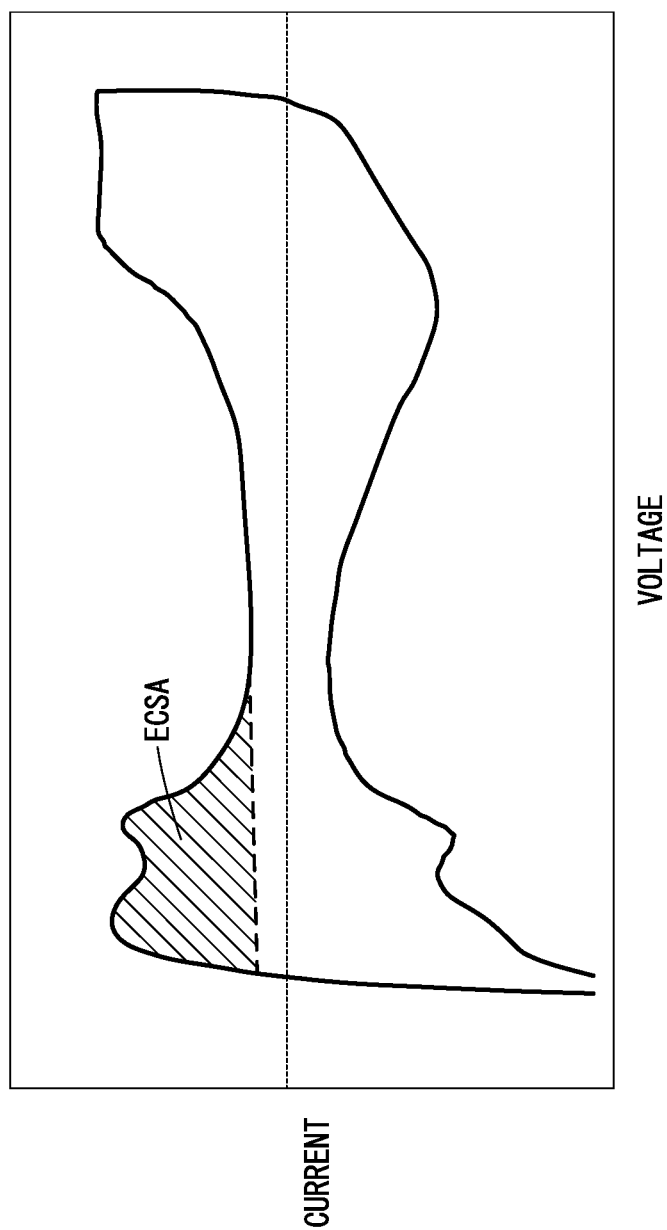
FIG. 6 is an example of a cyclic voltammogram obtained in an activation step.

In the activation step S30 (the first activation step S32 and the second activation step S34), the potential with respect to the fuel cell 10 is swept by the control unit 92. In other words, a voltage is applied to the fuel cell 10. In this case, it is common practice to sweep the potential difference between the anode 20 and the cathode 22 with the anode 20 potential being as a reference. On the display of the PC 96, on the basis of the sweep potential, the cyclic voltammogram is displayed as shown in FIG. 6. The horizontal axis in FIG. 6 represents a voltage value, and the vertical axis in FIG. 6 represents a current value.

By applying the voltage, impurities (such as oxides or the like) that adhere to the surface of the electrode catalyst are decomposed or removed. As a result, the ECSA of the electrode catalyst increases. Program software that is stored in the hard disk drive of the PC 96 obtains the ECSA on the basis of the cyclic voltammogram. The ECSA, for example, is obtained based on the area of the hatched portion shown in FIG. 6.

The ECSA sharply increases immediately after initiation of the activation step S30. In contrast thereto, after a certain time period has elapsed, the ECSA does not increase so much. More specifically, the rate of increase in the ECSA is large immediately after initiation of the activation step S30, and becomes smaller as time elapses.

Figure 7:
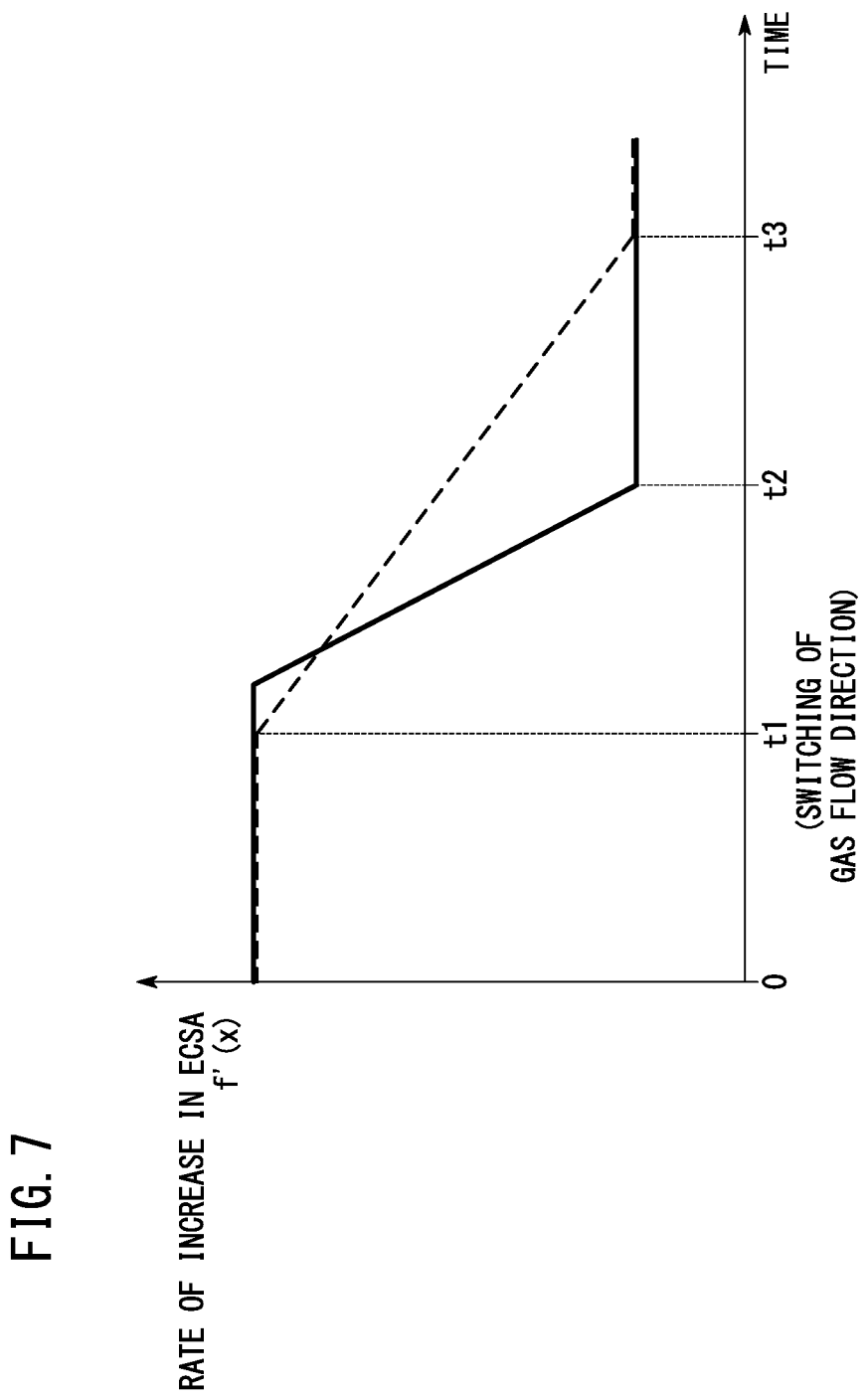
FIG. 7 is a graph representing a rate of increase in ECSA versus time.

When the ECSA is represented by a function of time $f(x)$, rate of increase in the ECSA can be obtained by differentiating the function $f(x)$. Hereinafter, the differentiated function will be represented by $f'(x)$. In FIG. 7, the differentiated function $f'(x)$, at a time when the humid hydrogen gas and the humid nitrogen gas are supplied in the first supply pattern and the activation step S30 is carried out, is shown by the dashed line. More specifically, in this case, the humid hydrogen gas is made to flow along the first forward direction, and the humid nitrogen gas is made to flow along the second forward direction. From FIG. 7, it can be understood that the rate of increase in the ECSA becomes smaller after time t1 has elapsed since the activation step S30 was initiated.

Furthermore, when the time period elapses and time t3 is reached, the rate of increase in the ECSA becomes constant. Stated otherwise, after time t3, the ECSA hardly increases at all. At this point in time, the control unit 92 determines that activation of the fuel cell 10 has been completed.

Figure 8:
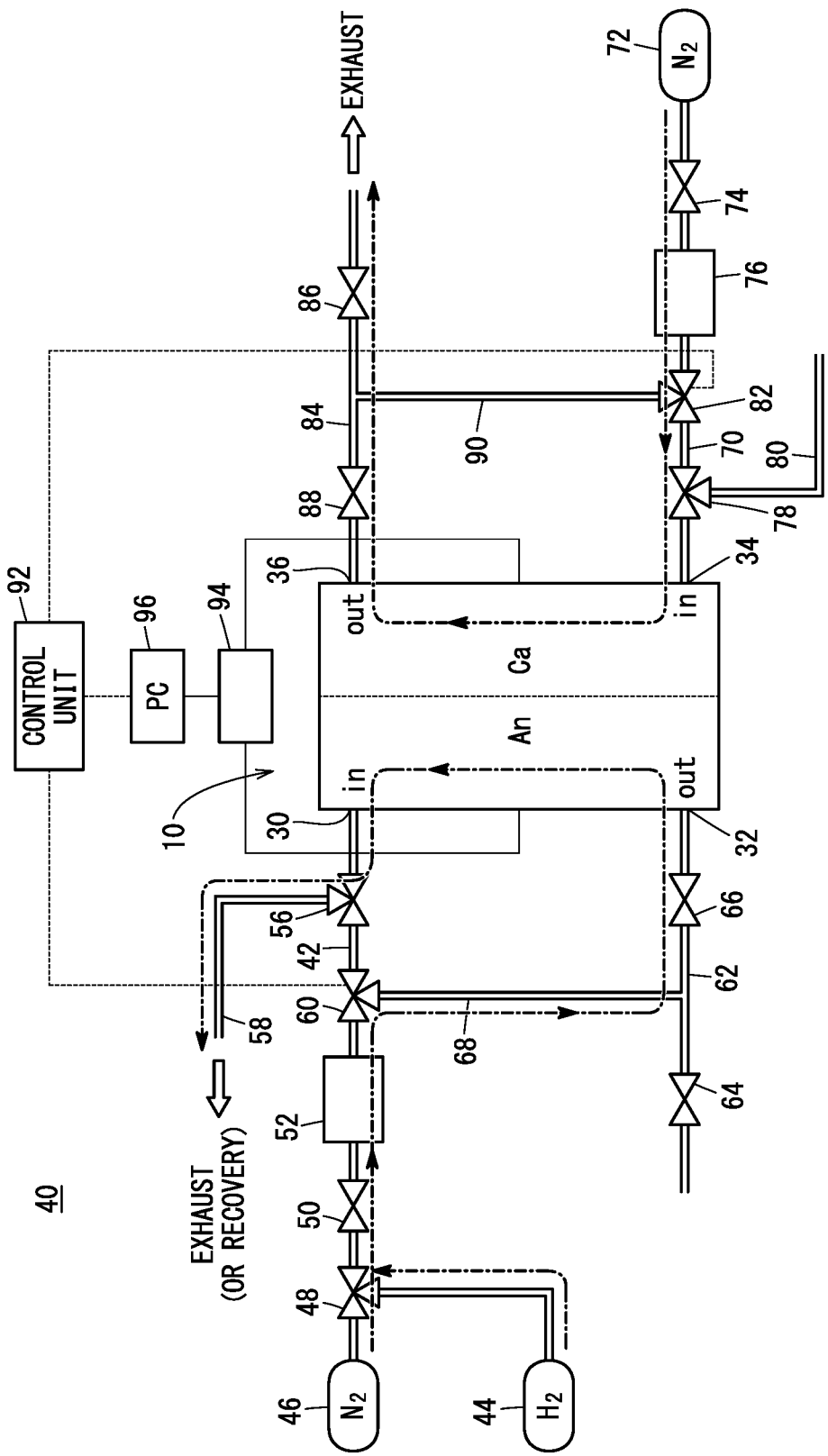
FIG. 8 is a schematic system diagram showing a state in which the activation device supplies the first gas and the second gas to the fuel cell in a third supply pattern.

The time t1 at this time is recorded in the program software. According to the present embodiment, when the humid hydrogen gas and the humid nitrogen gas are supplied in the second supply pattern and the time t1 has been reached, the second in-step switching step S33 is executed. Specifically, the humid hydrogen gas and the humid nitrogen gas are supplied in a third supply pattern shown in FIG. 8. More specifically, the humid hydrogen gas is made to flow along the first reverse direction, and the humid nitrogen gas is made to flow along the second forward direction. In this manner, the humid hydrogen gas and the humid nitrogen gas are supplied in the third supply pattern from the intermediate stage to the final stage of the activation process S30.

Specifically, the control unit 92 switches the first exhaust valve 64 to a closed state, and causes the first switching valve 60 to be operated in a direction in which communication takes place between the first gas line 42 and the first switching line 68. Further, the control unit 92 causes the first preliminary exhaust valve 56 to be operated in a direction in which communication takes place between the first gas line 42 and the first preliminary exhaust line 58. In the manner described above, the hydrogen gas that has flowed into the first gas line 42 from the hydrogen gas supply unit 44 passes through the first humidification unit 52, and after having become a humid hydrogen gas, the hydrogen gas flows into the second gas line 62 via the first switching valve 60 and the first switching line 68.

Next, the humid hydrogen gas passes through the first opening/closing valve 66 and flows into the interior of the fuel cell 10 from the first discharge port 32. Thereafter, the humid hydrogen gas passes through the first flow path 24 and the first supply port 30, and flows into the first preliminary exhaust line 58 via the first preliminary exhaust valve 56. Furthermore, thereafter, the humid hydrogen gas, for example, flows from the first preliminary exhaust line 58 and through the gas-liquid separator, and is recovered in the hydrogen recovery device.

At the same time, the control unit 92 switches the second exhaust valve 86 to an open state, and causes the second switching valve 82 to be operated in a direction in which communication between the third gas line 70 and the second switching line 90 is shut off. Further, the control unit 92 causes the second preliminary exhaust valve 78 to be operated in a direction in which communication between the third gas line 70 and the second preliminary exhaust line 80 is shut off. In the manner described above, the nitrogen gas that has flowed into the third gas line 70 from the nitrogen gas supply unit 72 passes through the second humidification unit 76, and after having become a humid nitrogen gas, the nitrogen gas passes through the second switching valve 82 and the second preliminary exhaust valve 78, and flows into the interior of the fuel cell 10 from the second supply port 34, and then flows through the second flow path 26.

Next, the humid nitrogen gas flows out from the second flow path 26 and into the second discharge port 36, and flows through the fourth gas line 84. At this time, the humid nitrogen gas passes through the second opening/closing valve 88 and the second exhaust valve 86. The humid hydrogen gas that has passed through the second exhaust valve 86, for example, is released into the atmosphere. Thereafter, by continuing to supply the gas, the process transitions from the second in-step switching step S33 to the second activation step S34.

In FIG. 7, the differentiated function f'(x), at a time when the humid hydrogen gas and the humid nitrogen gas are supplied in the manner described above and the activation step S30 is carried out, is shown by the solid line. As shown in FIG. 7, in this case, the rate of increase in the ECSA becomes constant at time t2, which is earlier than time t3. More specifically, according to the present embodiment, the fuel cell 10 can be activated in a shorter time period than in the activation method according to the conventional technology. The reason for this feature is conjectured to be as described below.

In the case that the second supply pattern is formed, the humid hydrogen gas and the humid nitrogen gas flow through from the upper side to the lower side in FIG. 5. Accordingly, in the first activation step S32, in the fuel cell 10 shown in FIG. 5, the hydrogen concentration and the water vapor concentration are high on the upper side and low on the lower side. In contrast thereto, in the case that the third supply pattern is formed, the humid hydrogen gas and the humid nitrogen gas flow through from the lower side to the upper side in FIG. 5. Accordingly, in the second activation step S34, in the fuel cell 10 shown in FIG. 5, the hydrogen concentration and the water vapor concentration are low on the upper side and high on the lower side.

More specifically, a concentration gradient is formed in the hydrogen concentration and the water vapor concentration. In FIGS. 9A to 9D, a hydrogen concentration gradient, and a water vapor concentration gradient in each of the first to fourth supply patterns, respectively, are shown schematically.

As noted previously, in the present embodiment, the flow directions of the humid hydrogen gas and the humid nitrogen gas are the same in the first activation step S32. In this case, in the fuel cell 10, the portion positioned upstream in the gas flow direction is preferentially activated. Also in the second activation step S34 in which the flow directions of the humid hydrogen gas and the humid nitrogen gas are reversed, the flow directions of the humid hydrogen gas and the humid nitrogen gas are the same. More specifically, in the fuel cell 10, the portion positioned downstream in the gas flow direction in the first activation step S32 is positioned upstream in the gas flow direction in the second activation step S34. Accordingly, the concerned portion is preferentially activated. When the activation step S30 is performed in this manner, the time period required to activate the fuel cell 10 is made shorter.

Further, in the activation step S30, the flow directions of the humid nitrogen gas and the humid hydrogen gas are changed (i.e., the supply pattern is changed) at the point in time when the rate of increase in the ECSA starts to decrease. More specifically, the hydrogen concentration profile and the water vapor concentration profile are caused to be reversed. Accordingly, it is possible to continue to cause the ECSA to be increased even after the flow directions of both gases have been changed. Consequently, the ECSA can be efficiently made to increase.

After the activation of the fuel cell 10 has been completed in the manner described above, a third inter-step switching step S35 is executed. Specifically, in a similar manner to the scavenging step S10, the humid nitrogen gas is supplied to the cathode 22 while simultaneously being supplied to the anode 20. The humid nitrogen gas supply pattern, for example, is the first supply pattern. Therefore, the control unit 92 causes the three-way valve 48 to be operated in a direction in which the nitrogen gas supply unit 46 is made to communicate with the first gas line 42. The control unit 92 places the first shutoff valve 50, the first opening/closing valve 66, and the first exhaust valve 64 in an open state. Further, the control unit 92 causes the first switching valve 60 to be operated in a direction in which communication between the first gas line 42 and the first switching line 68 is shut off. On the other hand, the control unit 92 places the second shutoff valve 74, the second opening/closing valve 88, and the second exhaust valve 86 in an open state. Further, the control unit 92 causes the second switching valve 82 to be operated in a direction in which communication between the third gas line 70 and the second switching line 90 is shut off. By continuing to supply the gas in this state, the process transitions from the third inter-step switching step S35 to the rescavenging step S40.

By the rescavenging step S40, the humid hydrogen gas inside the fuel cell 10 is replaced with the humid nitrogen gas. Further, liquid water produced by condensation of water vapor is discharged from the interior of the fuel cell 10. The humid nitrogen gas supply pattern in the rescavenging step S40 may be the second supply pattern, the third supply pattern, or the fourth supply pattern.

After a predetermined time period has elapsed since the rescavenging step S40 was initiated, the control unit 92 closes the first shutoff valve 50, the first opening/closing valve 66, the second shutoff valve 74, and the second opening/closing valve 88. Consequently, the rescavenging step S40 is brought to an end. The fuel cell 10 is placed in a state in which it is capable of being disconnected from the activation device 40.

As noted previously, in the present embodiment, the activation method for the fuel cell (10), for activating the fuel cell, is disclosed, the fuel cell being equipped with the membrane electrode assembly (14) in which the electrolyte membrane (18) is sandwiched between the anode (20) and the cathode (22), the first supply port (30) that supplies the fuel gas to the anode, the first discharge port (32) that discharges the fuel gas from the anode, the second supply port (34) that supplies the oxygen-containing gas to the cathode, and the second discharge port (36) that discharges the oxygen-containing gas from the cathode, the activation method for the fuel cell including the activation step of activating the fuel cell using the hydrogen gas and the wet gas, the activation step including the first activation step of causing the hydrogen gas to flow into the fuel cell through the first supply port or the first discharge port, and causing the wet gas to flow into the fuel cell through the second supply port or the second discharge port, the second activation step, after completion of the first activation step, of causing the hydrogen gas to flow into the fuel cell through the first supply port or the first discharge port, and causing the wet gas to flow into the fuel cell through the second supply port or the second discharge port, and the direction switching step, at the time of transitioning from the first activation step to the second activation step, of switching the flow direction of at least one of the hydrogen gas or the wet gas to the opposite direction.

By causing the flow direction of the hydrogen gas or the flow direction of the wet gas to be reversed, in the membrane electrode assembly, a portion that was not sufficiently activated in the first activation step prior to the flow direction being reversed (i.e., a portion positioned downstream in the gas flow direction) is preferentially activated in the second activation step after the flow direction has been reversed. Therefore, it is possible to uniformly activate the membrane electrode assembly in a relatively short time period. Accordingly, it is not necessary to continue the activation process over a long time period in order to make the degree of activation of the membrane electrode assembly uniform. Consequently, the time required for the activation process of the fuel cell can be shortened, and the efficiency of the process can be enhanced.

In the present embodiment, the activation method for the fuel cell is disclosed, in which, in the activation step, the hydrogen gas and the wet gas are supplied in any one of the first to fourth supply patterns that differ from each other. More specifically, in the first activation step, the hydrogen gas and the wet gas are supplied in one of the first to fourth supply patterns, and in the second activation step, the hydrogen gas and the wet gas are supplied in another one of the first to fourth supply patterns.

In this instance, the first supply pattern is a supply pattern in which the hydrogen gas is supplied in the first forward direction from the first supply port toward the first discharge port, and the wet gas is supplied in the second forward direction from the second supply port toward the second discharge port. The second supply pattern is a supply pattern in which the hydrogen gas is supplied in the first forward direction, and the wet gas is supplied in the second reverse direction from the second discharge port toward the second supply port. The third supply pattern is a supply pattern in which the hydrogen gas is supplied in the first reverse direction from the first discharge port toward the first supply port, and the wet gas is supplied in the second forward direction. The fourth supply pattern is a supply pattern in which the hydrogen gas is supplied in the first reverse direction, and the wet gas is supplied in the second reverse direction.

By switching between the four supply patterns in this manner, it becomes possible to intensively activate predetermined portions of the membrane electrode assembly.

In particular, in the first activation step, preferably, the gas is supplied in one of the second supply pattern and the third supply pattern, and in the second activation step, the gas is supplied in the other one of the second supply pattern and the third supply pattern. More specifically, according to the present embodiment, the activation method for the fuel cell is disclosed, wherein, in the first activation step, the hydrogen gas and the wet gas are supplied in one of the second supply pattern and the third supply pattern, and in the second activation step, the hydrogen gas and the wet gas are supplied in the other one of the second supply pattern and the third supply pattern.

In this case, for example, the flow direction of the hydrogen gas and the flow direction of the wet gas coincide with each other. Accordingly, in the first activation step, in the membrane electrode assembly, one of a portion positioned upstream and a portion positioned downstream in the flow direction of the hydrogen gas and the wet gas is intensively activated. In the second activation step, in the membrane electrode assembly, the other one of the portions positioned upstream and downstream in the flow direction of the hydrogen gas and the wet gas is intensively activated.

In accordance with this feature, the membrane electrode assembly can be rapidly activated. Further, the degree of activation in the membrane electrode assembly can be made uniform over the entire membrane electrode assembly.

In the present embodiment, the activation method for the fuel cell is disclosed. The method further includes the scavenging step of supplying the inert gas to the anode and supplying the inert gas to the cathode, thereby scavenging the gas remaining inside the fuel cell with the inert gas, the preparation step, after completion of the scavenging step, of switching the gas supplied to the anode to hydrogen gas, and the activation step which is carried out after the preparation step, wherein in the activation step, the voltage is applied to the membrane electrode assembly while the hydrogen gas is supplied to the anode and the humidified inert gas is supplied as the wet gas to the cathode, the activation method further including the first inter-step switching step of switching a flow direction of at least one of the gas supplied to the anode or the gas supplied to the cathode to an opposite direction, at a time when transitioning from the scavenging step to the preparation step, and the second inter-step switching step of switching the flow direction of at least one of the gas supplied to the anode or the gas supplied to the cathode in an opposite direction, at a time when transitioning from the preparation step to the activation step.

In this case, the flow direction of at least one of the gas supplied to the anode or the gas supplied to the cathode is switched at the time of transitioning from the preceding step to the next step. Accordingly, the hydrogen gas, the water vapor, or the like is placed in even contact substantially over the entire surface along the surface direction of the membrane electrode assembly. Therefore, it is possible to bring about a humidified state of the membrane electrode assembly uniformly along the surface direction. Consequently, in the activation step, the membrane electrode assembly can be uniformly and efficiently activated along the surface direction of the membrane electrode assembly.

In the present embodiment, the activation method for the fuel cell is disclosed, in which, in the scavenging step, the flow direction of at least one of the inert gas supplied to the anode or the inert gas supplied to the cathode is switched in an opposite direction.

In accordance with this feature, in the scavenging step, scavenging in the fuel cell proceeds rapidly in the scavenging step.

In the present embodiment, the activation method for the fuel cell is disclosed, in which, in the activation step, the index is acquired that represents the efficiency of activation of the membrane electrode assembly, and the direction switching step is performed at a time when the index has become less than or equal to a predetermined value.

In this case, the supply pattern of the hydrogen gas or the wet gas is switched at a time when the activation efficiency of the membrane electrode assembly decreases. Consequently, in the membrane electrode assembly, a portion thereof in which activation has not sufficiently progressed prior to switching of the supply pattern is preferentially activated after the supply pattern has been switched. Accordingly, it is easy for the membrane electrode assembly to be uniformly activated.

In the present embodiment, the activation method for the fuel cell is disclosed, in which the inert gas is humidified and supplied as the wet gas.

In accordance with this feature, it is possible to easily apply moisture to the membrane electrode assembly.

Further, in the present embodiment, the activation device (40) is disclosed, which activates the fuel cell equipped with the membrane electrode assembly (14) in which an electrolyte membrane (18) is sandwiched between the anode (20) and the cathode (22), the first supply port (30) that supplies the fuel gas to the anode, the first discharge port (32) that discharges the fuel gas from the anode, the second supply port (34) that supplies the oxygen-containing gas to the cathode, and the second discharge port (36) that discharges the oxygen-containing gas from the cathode, the activation device including the first gas line (42) connected to the first supply port, the first gas supply unit (44, 46) connected to the first gas line and that supplies the first gas, the second gas line (62) connected to the first discharge port, the first switching line (68) connected to the first gas line and the second gas line, the first switching valve (60) that switches between a state in which the first gas supplied from the first gas supply unit is made to flow from the first gas line to the first supply port, and a state in which the first gas supplied from the first gas supply unit and that has flowed into the first gas line passes through the first switching line and is made to flow from the second gas line to the first discharge port, the third gas line (70) connected to the second supply port, the second gas supply unit (72) connected to the third gas line and configured to supply the second gas, the fourth gas line (84) connected to the second discharge port, the second switching line (90) connected to the third gas line and the fourth gas line, the second switching valve (82) that switches between a state in which the second gas supplied from the second gas supply unit is made to flow from the third gas line to the second supply port, and a state in which the second gas supplied from the second gas supply unit and that has flowed into the third gas line passes through the second switching line and is made to flow from the third gas line to the second discharge port, and the control unit (92) that controls the first switching valve and the second switching valve, and thereby switches the flow direction of each of the first gas and the second gas.

In the activation device, owing to the above configuration, it is possible to switch the gas supply patterns in various ways, in accordance with the progress of the steps of the activation method. Accordingly, as noted previously, the activation device can uniformly and efficiently activate the membrane electrode assembly.

In the present embodiment, the activation device is disclosed, which further includes the voltage application unit (94) that applies a voltage to the membrane electrode assembly.

In this case, it is possible to sweep the potential with respect to the membrane electrode assembly. More specifically, so-called CV aging can be applied with respect to the membrane electrode assembly.

In the present embodiment, the activation device is disclosed, which further includes the index acquisition unit (96) that acquires the index that represents the efficiency of activation of the membrane electrode assembly, wherein the control unit controls the first switching valve and the second switching valve at a time when the index has become less than or equal to a predetermined value.

In accordance with such a configuration, it is possible to switch the supply pattern of the first gas or the second gas at a time when the activation efficiency of the membrane electrode assembly decreases. More specifically, in the membrane electrode assembly, a portion thereof in which activation has not sufficiently progressed prior to switching of the supply pattern can be preferentially activated after the supply pattern has been switched. Accordingly, the membrane electrode assembly can be uniformly activated.

As suitable examples of the first gas, there may be cited an inert gas and hydrogen gas. As suitable examples of the second gas, there may be cited an inert gas. More specifically, in the present embodiment, the activation device is disclosed, which further includes the inert gas supply unit (46) and the hydrogen gas supply unit (44) serving as the first gas supply unit, and the inert gas supply unit (72) serving as the second gas supply unit.

In the present embodiment, the activation device is disclosed, in which the first humidification unit (52) is provided in the first gas line, and the second humidification unit (76) is provided in the third gas line.

In accordance with such a configuration, it is possible to easily apply moisture to the membrane electrode assembly.

The present invention is not limited to the above disclosure, and various modifications can be adopted therein without departing from the essence and gist of the present invention.

The supply pattern in the scavenging step S10, the supply pattern in the preparation step S20, and the supply pattern in the activation step S30, respectively, are not limited to the supply patterns illustrated in the above-described embodiment. For example, the sequential ordering of the fourth supply pattern and the first supply pattern may be set in the scavenging step S10, and the supply pattern in the preparation step S20 may be the fourth supply pattern. In this case, the supply patterns in the activation step S30 may be sequentially in order of the third supply pattern and the second supply pattern. However, in this case as well, the supply patterns in the activation step S30 may be sequentially in order of the third supply pattern and the second supply pattern.

In the activation step, a hydrogen pumping operation, or alternatively, power generation aging or the like may be performed. In the case of power generation aging, in the first activation step and the second activation step, a humid oxygen-containing gas is supplied to the cathode 22. As a representative example of the oxygen-containing gas, there may be cited compressed air.

The invention claimed is:

1. An activation method for a fuel cell, for activating the fuel cell, the fuel cell being equipped with a membrane electrode assembly in which an electrolyte membrane is sandwiched between an anode and a cathode, a first supply port configured to supply a fuel gas to the anode, a first discharge port configured to discharge the fuel gas from the anode, a second supply port configured to supply an oxygen-containing gas to the cathode, and a second discharge port configured to discharge the oxygen-containing gas from the cathode, the activation method for the fuel cell comprising:
   activating the fuel cell using a hydrogen gas and a wet gas;
   the activating including:
   performing a first activation in which the hydrogen gas is caused to flow into the fuel cell through the first supply port or the first discharge port and the wet gas is caused to flow into the fuel cell through the second supply port or the second discharge port;
   performing, after completion of the first activation, a second activation in which the hydrogen gas is caused to flow into the fuel cell through the first supply port or the first discharge port and the wet gas is caused to flow into the fuel cell through the second supply port or the second discharge port; and
   performing, at a time of transitioning from the first activation to the second activation, a direction switching in which a flow direction of at least one of the hydrogen gas or the wet gas is switched to an opposite direction.

2. The activation method for the fuel cell according to claim 1, wherein:
   in the activating, the hydrogen gas and the wet gas are supplied in one of a first supply pattern, a second supply pattern, a third supply pattern, and a fourth supply pattern that differ from each other;
   the first supply pattern is a supply pattern in which the hydrogen gas is supplied in a first forward direction from the first supply port to the first discharge port, and the wet gas is supplied in a second forward direction from the second supply port to the second discharge port;
   the second supply pattern is a supply pattern in which the hydrogen gas is supplied in the first forward direction, and the wet gas is supplied in a second reverse direction from the second discharge port to the second supply port;
   the third supply pattern is a supply pattern in which the hydrogen gas is supplied in a first reverse direction from the first discharge port to the first supply port, and the wet gas is supplied in the second forward direction;
   the fourth supply pattern is a supply pattern in which the hydrogen gas is supplied in the first reverse direction, and the wet gas is supplied in the second reverse direction;
   in the first activation, the hydrogen gas and the wet gas are supplied in one of the first to fourth supply patterns; and
   in the second activation, the hydrogen gas and the wet gas are supplied in another one of the first to fourth supply patterns.

3. The activation method for the fuel cell according to claim 2, wherein:
   in the first activation, the hydrogen gas and the wet gas are supplied in one of the second supply pattern and the third supply pattern; and
   in the second activation, the hydrogen gas and the wet gas are supplied in another one of the second supply pattern and the third supply pattern.

4. The activation method for the fuel cell according to claim 1, further comprising:
   supplying an inert gas to the anode and supplying an inert gas to the cathode, thereby scavenging gas remaining inside the fuel cell with the inert gas;
   performing, after completion of the scavenging, a preparation in which the gas supplied to the anode is switched to hydrogen gas; and
   performing the activating after the preparation;
   wherein, in the activating, a voltage is applied to the membrane electrode assembly while the hydrogen gas is supplied to the anode and a humidified inert gas is supplied as the wet gas to the cathode;
   the activation method further comprising:
   performing a first switching in which a flow direction of at least one of the gas supplied to the anode or the gas supplied to the cathode is switched to an opposite direction, at a time when transitioning from the scavenging to the preparation; and
   performing a second switching in which a flow direction of at least one of the gas supplied to the anode or the gas supplied to the cathode is switched to an opposite direction, at a time when transitioning from the preparation to the activating.

5. The activation method for the fuel cell according to claim 4, wherein, in the scavenging, a flow direction of at least one of the inert gas supplied to the anode or the inert gas supplied to the cathode is switched to an opposite direction.

6. The activation method for the fuel cell according to claim 4, wherein the inert gas is humidified and supplied as a wet gas.

7. The activation method for the fuel cell according to claim 1, wherein, in the activating, an index representing an efficiency of activation of the membrane electrode assembly is acquired, and the direction switching is performed at a time when the index has become less than or equal to a predetermined value.

8. An activation device configured to activate a fuel cell equipped with a membrane electrode assembly in which an electrolyte membrane is sandwiched between an anode and a cathode, a first supply port configured to supply a fuel gas to the anode, a first discharge port configured to discharge the fuel gas from the anode, a second supply port configured to supply an oxygen-containing gas to the cathode, and a second discharge port configured to discharge the oxygen-containing gas from the cathode, the activation device comprising:
- a first gas line connected to the first supply port;
- a first gas supply unit connected to the first gas line and configured to supply a first gas;
- a second gas line connected to the first discharge port;
- a first switching line connected to the first gas line and the second gas line;
- a first switching valve configured to switch between a state in which the first gas supplied from the first gas supply unit is made to flow from the first gas line to the first supply port, and a state in which the first gas supplied from the first gas supply unit and that has flowed into the first gas line passes through the first switching line and is made to flow from the second gas line to the first discharge port;
- a third gas line connected to the second supply port;
- a second gas supply unit connected to the third gas line and configured to supply a second gas;
- a fourth gas line connected to the second discharge port;
- a second switching line connected to the third gas line and the fourth gas line;
- a second switching valve configured to switch between a state in which the second gas supplied from the second gas supply unit is made to flow from the third gas line to the second supply port, and a state in which the second gas supplied from the second gas supply unit and that has flowed into the third gas line passes through the second switching line and is made to flow from the third gas line to the second discharge port; and
- one or more processors that execute computer-executable instructions stored in a storage device, wherein the one or more processors execute the computer-executable instructions to cause the activation device to control the first switching valve and the second switching valve, and thereby switch a flow direction of each of the first gas and the second gas.

9. The activation device according to claim 8, further comprising a voltage application unit configured to apply a voltage to the membrane electrode assembly.

10. The activation device according to claim 8, wherein the one or more processors further cause the activation device to acquire an index representing an efficiency of activation of the membrane electrode assembly, and to control the first switching valve and the second switching valve at a time when the index has become less than or equal to a predetermined value.

11. The activation device according to claim 8, further comprising an inert gas supply unit and a hydrogen gas supply unit serving as the first gas supply unit, and an inert gas supply unit serving as the second gas supply unit.

12. The activation device according to claim 11, wherein a first humidification unit is provided in the first gas line, and a second humidification unit is provided in the third gas line.

* * * * *